United States Patent Office 3,470,251
Patented Sept. 30, 1969

3,470,251
SEPARATION AND PURIFICATION OF SECONDARY ALKYL PRIMARY AMINES
William R. Siegart, Poughkeepsie, Peter C. Peropoulos, Fishkill, Ronald E. Jones, Glenham, and William Smolin, Wappingers Falls, N.Y., assignors to Texaco Inc., New York, N.Y., a corporation of Delaware
No Drawing. Filed June 30, 1967, Ser. No. 650,242
Int. Cl. C07c 85/16
U.S. Cl. 260—583    12 Claims

ABSTRACT OF THE DISCLOSURE

Method for the purification of secondary alkyl primary amines from crude mixtures containing, in addition to the amine, n-paraffins, ketones, alcohols and polyfunctionals wherein the crude mixture is initially treated with measured amounts of water and an inorganic acid thereby forming an aqueous amine salt layer, washing the aqueous amine salt layer with a liquid hydrocarbon, treating the aqueous amine salt layer with a base and separating the amines from the aqueous layer.

---

This invention relates to a processs for the separation and recovery of amines from crude mixtures containing the same and, more particularly, to the separation and recovery of secondary alkyl primary amines having from 10 to 25 carbon atoms.

Secondary alkyl primary amines can be prepared from $C_{10}$ to $C_{25}$ paraffin hydrocarbons by initially nitrating the paraffin with nitric acid or nitrogen dioxide and thereafter reducing, with hydrogen, the nitroparaffin in the presence of a hydrogenation catalyst. In practice, it has been found desirable to convert about 5 to 50% of the paraffin to the corresponding nitroparaffin along with lesser amounts of ketones, alcohols, acids and poly-functionals thereby forming a crude nitrated product. The crude, and particularly the nitroparaffin portion thereof, is thereafter hydrogenated to its corresponding amine and, in turn, yields a crude hydrogenated mixture including secondary alkyl primary amines, ketones, alcohols, polyfunctionals and paraffin. Moreover, in copending application Ser. No. 650,220 filed on June 30, 1967, entitled Production of Primary Amines by Patterson et al. and assigned to Texaco Inc., hereby incorporated by reference, a process is disclosed wherein ketones and alcohols in addition to the nitroparaffin contained in the crude nitrated product are converted to corresponding amines. In either instance, that is, whether or not conversion of alcohols and ketones to amines is contemplated, recovery of the secondary alkyl primary amine from crude hydrogenated mixtures employing conventional separation and recovery techniques leave much to be desired. Conventional separation and recovery methods heretofore suggested include treatment of the crude hydrogenated product with hydrochloric acid wherein an amine hydrochloride is formed, followed by removal of the unreacted products by steam distillation, thereafter treating the amine salt with alkali metal hydroxides and finally vacuum distilling the product. Although such a process may yield products of purity approaching 96% there remains a need for a process wherein the designated amines are provided in purities of 98% and higher. Again, the use of steam distillation in such a process results in at least a one to two percent conversion of primary amine to undesired secondary amine which remains as a contaminant in the final product.

It is therefore an object of this invention to provide a new and economical process for the recovery and separation of secondary alkyl primary amines.

Another object of this invention is to provide a process wherein secondary alkyl primary amines may be separated from crude hydrogenated nitroparaffin mixtures in high purity.

Yet another object of this invention is to provide a process wherein secondary alkyl primary amines may be separated from crude hydrogenated nitroparaffin mixtures in good yields.

Other objects and advantages will become apparent from reading the following detailed description and examples.

Broadly, this invention contemplates a process for the separation and recovery of secondary alkyl primary amines having from 10 to 25 carbon atoms from crude hydrogenated nitroparaffin compositions containing the above amine along with a $C_{10}$ to $C_{25}$ alcohol, ketone, paraffin and polyfunctionals which comprises treating the crude composition with an inorganic acid and water, the water added in an amount ranging from 0.15 to 6 preferably 0.20 to 3.0 volumes of water per volume of crude mixture and the acid added in such quantity as to provide the aqueous phase formed by such addition with a pH ranging from about 3.5 to 7, preferably 4 to 6, separating and washing the resultant aqueous layer with a liquid hydrocarbon, separating and treating the resultant aqueous layer with a base to free the amine which is recovered as an amine layer.

The crude hydrogenated nitroparaffin mixture and particularly the secondary alkyl primary amine portion thereof subsequently separated and purified according to this invention is derived from a paraffin hydrocarbon or paraffin hydrocarbon mixture having from 10 to 25 carbon atoms which is initially nitrated and subsequently hydrogenated to the corresponding amine. Amine compositions of substantially uniform or mixed chain lengths fall within the purview of this invention as, for example, crude hydrogenated products containing amino decanes, amino undecanes, amino dodecanes, amino tetradecanes, amino pentadecanes, amino eicosanes, and amino pentacosanes, or mixtures of $C_{10}$ to $C_{14}$ amines, $C_{14}$ to $C_{15}$ amines and $C_{17}$ to $C_{22}$ amines. The alkyl portion of the amine is a straight chain hydrocarbon and the amino group is attached to the carbon chain predominantly on other than a terminal carbon atom. The separation and recovery of such amines from crude amine products thus derived have in the past caused undue difficulty in the separation stages, particularly in the separation of unconverted nitroparaffins, ketones and alcohols.

It has now been found that such separations can be effectively carried out wherein the selected amine or mixed amine composition can be recovered in purities of at least 98% by initially treating the crude amine product with specific amounts of inorganic acid such as hydrochloric, nitric, sulfuric or phosphoric acid in conjunction with measured amounts of water forming an aqueous amine salt phase.

A critical feature of this invention resides in the amount of acid and water admixed with the crude amine product. The water, acid and crude amine product when combined within limited proportions and narrow ranges of pH, form two layers, a hydrocarbon layer composed of primarily paraffins, alcohols, ketones, unreduced nitroparaffins and polyfunctionals such as nitroketones, nitroalcohols and dinitroparaffins, and an aqueous layer predominantly containing an amine salt along with alcohols, ketones, paraffins and polyfunctionals such as aminoalcohols, aminoketones, diamines and secondary amines formed from the interaction of acid and amine. The operative limits of this process have been found to fall within a water-to-crude volume ratio of between 0.15 and 6 volumes of water for each volume of crude and preferably 0.20 to 3. Amounts less than 0.15 volume of water have been found to be undesirable in that such amounts are insufficient to substantially solubilize the amine salt and, additionally, excessive quantities of n-paraffin and by-products such as ketones are carried into the amine-salt solution layer. Amounts in excess of 6 volumes of water are undesirable in that a third layer is formed containing substantial amounts of both amine salt and paraffin. Similarly, careful control must be exercised over acid addition so as to provide the aqueous layer with a pH ranging from about 3.5 to 7 and preferably a narrower range of about between 4 and 6. The addition of excess acid, that is, pH's below 3.5 should be avoided since under these conditions the amine salts are displaced from the aqueous layer and into the hydrocarbon layer. Likewise, insufficient acid, that is pH's above 7, are undesirable inasmuch as substantial amounts of amine remain unconverted to the amine salt and such unconverted amine is subsequently solubilized in the hydrocarbon layer. According to this process, it has been found that from about 1 to 1.6 mole of acid, as for example, hydrochloric nitric, sulfuric or phosphoric, are employed per mole of amine, and preferably 1 to 1.3 mole of acid. Based upon the inorganic acid employed, selected water to crude volume ratios have been found to be applicable within the range stated above. For example, where a monobasic acid is contemplated, such as hydrochloric or nitric acid, water in amounts ranging from about 1.0 to 6 volumes per volume of crude and perferably between 1.5 and 3 volumes are employed. Where a polybasic acid is contemplated, such as sulfuric or phosphoric acid, water in amounts ranging from about 0.15 to 1.0 volume per volume of crude and preferably between 0.2 and 0.5 volume is employed.

The aqueous layer thus formed contains in addition to the amine salt about 25% paraffin on a water free basis along with ketones and alcohols. Although this amount of paraffin is acceptable in the aqueous layer mentioned above, the percent may be reduced by admixing the crude amine with acid and water and separating the aqueous and hydrocarbon layers at temperatures of from about 50° F. to about 250° F. and preferably between 100-200° F. under atmospheric or higher pressures. By increasing the acid-water treatment temperature, the solubility of non-amine salt components in the aqueous layer is decreased. In like manner where higher molecular weight amines are to be recovered, that is, amines having carbon chain lengths of from 14 to 25 carbon atoms, the tendency to form aqueous emulsions is reduced where temperatures of 100° F. or higher are employed. Finally, a higher temperature favors amine salt solubility in the aqueous layer.

In combination with the initial water-acid treatment, the aqueous amine salt phase after separation from the hydrocarbon layer is contacted with a suitable liquid hydrocarbon under conditions to selectively remove the remaining paraffin, ketone, alcohol and some polyfunctionals. More specifically, the processing steps embodied herein comprise contacting the aqueous amine salt phase with a liquid hydrocarbon having from 4 to 8 carbon atoms at a temperature ranging from about 50° F. to 212° F. at pressures of 1 atmosphere or higher to extract all or substantially all of the non-amine salt components in the aqueous phase. Applicable liquid hydrocarbons contemplated include aliphatics such as butane, pentane, hexane, heptane, octane and isooctane; olefins such as butene and octene; cycloaliphatics such as cyclohexane; aromatics such as benzene, toluene and xylene. A preferred liquid hydrocarbon, pentane, has been found to be particularly effective in selectively and substantially extracting the remainder of the paraffin, ketone, alcohol and any polyfunctionals not containing an amine function from the aqueous phase.

Either continuous, batch or batch-continuous concurrent or countercurrent operation is permissible in this step of the process. The exact manner is not critical provided that the aqueous amine salt solution being purified is brought into intimate contact with the solvent. The amount of solvent used is a function of the number of stages and the required ultimate purity. It is determined also by whether the operation is countercurrent or concurrent. For example, in batch concurrent operations at least 0.5 volume of liquid hydrocarbon, and preferably about 1 to 2 volumes, are required for one volume of aqueous amine salt solution. In a batch-continuous system however, where the liquid hydrocarbon is continuously stripped from the extract to recycle, much less solvent is needed.

The resulting aqueous layer after removal of the remaining paraffin and ketone, alcohol and any polyfunctionals not containing an amine function is thereafter treated with at least a stoichiometric amount of a base and generally from about one to two moles of base where a monobasic acid such as hydrochloric or nitric acid is employed, and about two to three moles of base where a polybasic acid such as sulfuric or phosphoric acid is used. Suitable bases include sodium or potassium hydroxide, ammonia, or ammonium hydroxide, lime, alkaline earth metal hydroxides or oxides, carbonates or acid carbonates such as sodium carbonates or sodium bicarbonates thereby springing the amine from the aqueous layer. The amine is recovered by phase separation leaving an aqueous layer containing the alkali or alkaline earth or ammonium salt and may be disposed of as desired.

The amine layer thus separated contains approximately from 50 to 90% amine. Recovery of the amine, in purities of 99% and greater may be obtained by initially flashing off water and liquid hydrocarbon from the amine layer and thereafter vacuum distilling and recovering the amine.

The high purity amines provided by the instant process are highly desirable in such applications as biocides, textile treating agents, fabric softeners, lubricant and fuel additives, surfactants and catalysts.

EXAMPLE I 170 pounds of n-paraffin having the following chain length distribution and weight percent was charged to a 50 gallon reactor:

| | |
|---|---|
| $C_{10}$ | 8.5 |
| $C_{11}$ | 30.8 |
| $C_{12}$ | 29.2 |
| $C_{13}$ | 25.3 |
| $C_{14}$ | 6.1 |
| $C_{15}$ | 0.1 |

The reactor was equipped with a condenser maintained at 80° F. to 100° F. which condensed any volatilized hydrocarbon condensate to a separator where the hydrocarbon layer was drawn off and returned to the reactor.

The reaction mixture was heated to 330° F., with stirring, under a nitrogen atmosphere and 25 pounds of $NO_2$ was added at a rate of 5 pounds per hour. After such time the reactor was cooled to 150° F. 26.3 pounds of an aqueous solution containing 5% sodium bicarbonate was then charged to the reactor and stirred for ¼ hour and the mixture was permitted to settle for ½ hour. The aqueous layer was drained from the bottom of the reactor and the reaction mixture washed with 20 pounds of water and stirred for ¼ hour, again settled for ½ hour, and the aqueous layer drained off The crude nitrated product in the reactor was filtered and 176.1 pounds of crude nitrated product was obtained which analyzed on a weight percent basis as follows:

| | |
|---|---|
| Nitroparaffin | 27.2 |
| n-Paraffin | 63.6 |
| Oxygenates | 4.2 |
| Polyfunctional | 4.7 |

130 pounds of the above crude nitrated product were charged into a concurrent downflow hydrogenation reactor maintained at 500 p.s.i.g. and a nominal temperature of 300° F. (250-370° F.). The liquid hourly space velocity was 0.675 volume of crude liquid per volume of catalyst per hour. Hydrogen was introduced at a space velocity of 4.82 cubic feet per hour per liter of liquid feed. The catalyst was 50 weight percent nickel on a kieselguhr support activated with a 2 weight percent zirconium. A total of 123.24 pounds of crude hydrogenated product was obtained.

29.5 pounds of this crude hydrogenated product was charged into a 20 gallon glass kettle and 14,932 ml. of 1.5 N HCl was charged to the kettle and the mixture stirred for 1 hour. The pH of the aqueous solution was about 5. An additional 41.8 pounds of water was added and the mixture stirred for an additional hour. The mixture was thereafter allowed to settle for 3 hours whereupon the layers were separated yielding 19.7 pounds of a hydrocarbon phase and 85.0 pounds of aqueous phase. The aqueous phase contained 78.2 weight percent amine and 21.8 weight percent paraffin on a water free basis.

The aqueous layer was recharged into a kettle along with 55.3 pounds of pentane and the mixture stirred 1 hour and settled for 2 hours. The layers were separated to yield 45.8 pounds of a hydrocarbon phase and 81.8 pounds of an aqueous phase. The aqueous layer contained 93.8 weight percent amine and 6.2 weight percent paraffin on a water free and pentane free basis. The aqueous phase was recharged to a 20 gallon kettle along with 51.3 pounds of pentane, stirred 1 hour and settled for 2 hours. The layers were then separated to yield 49.8 pounds of hydrocarbon phase and 82.1 pounds of aqueous phase. The aqueous layer was recharged to a 20 gallon kettle along with 5.6 pounds of 30% NaOH in water, stirred ½-hour and allowed to settle for 4 hours. The layers were separated to yield 10.4 pounds of hydrocarbon phase and 75.5 pounds of aqueous phase. The hydrocarbon phase consisted of approximately 50 weight percent amine and 50 weight percent pentane.

29.1 pounds of the hydrocarbon phase was charged to a batch still and pentane was stripped off at atmospheric pressure and a pot temperature 252° F. The weight of pentane taken overhead was 15.16 pounds. The pot was cooled to 120° F. and evacuated to 20 torr. The temperature was again raised and a forerun of 170 cc. was collected.

A total of 10.45 pounds of amine product was collected at a head temperature of 300° F. and a pot temperature of 390° F. 2.0 pounds of bottom material were recovered. The distilled primary amines gave the following analysis:

| Component: | Weight percent |
| --- | --- |
| n-Paraffins | 0.5 |
| Amino decanes | 8.4 |
| Amino undecanes | 32.0 |
| Amino dodecanes | 30.2 |
| Amino tridecanes | 25.0 |
| Amino tetradecanes | 3.9 |

Elemental analysis

| | |
| --- | --- |
| C, percent | 76.5 |
| H, percent | 15.0 |
| N, percent | 7.8 |
| Basic nitrogen, percent | 7.7 |
| Molecular weight | 187 |
| Refractive index $n_D^{25}$ | 1.4389 |
| Density, 20° C. | 0.7984 |
| Flash, °F. | 230 |
| Fire, °F. | 235 |
| Freezing point, °F. | −63 |
| Pour point, °F. | −65 |
| Cloud point, °F. | −60 |
| Color: Gardner | <1 |
| ASTM | <0.5 |

EXAMPLE II

Into a three-neck one liter round bottom flask equipped with a stirrer, gas bubbler, and a gas exit tube, was charged 581 grams of hydrogenation reactor effluent from Example I. 36 grams of HCl gas was bubbled into the stirred liquid over a 30 minute period whereupon the contents of the flask reached a pH of 4. The acidified solution was removed from the flask and charged to a separatory funnel and extracted with two liters of water. The paraffin layer after drying with calcium sulfate weighed 358.5 grams and contained 0.5 gram of amines.

The aqueous-amine salt solution was extracted twice with 1600 ml. portions of pentane. To the aqueous-amine salt solution was added 4 N NaOH until the pH was 10 and the amine layer separated from the water layer. Water and carry-along pentane were removed by distillation from the amine layer at 25–50° C. and at a pressure of 14–20 torr. The yield of crude amines was 142.7 grams. The amines are thereafter distilled through a 6 inch column at 14 torr. and at 208–287.6° F. to obtain 128 grams of 99+ percent purity primary amine product.

EXAMPLE III

Into a four-liter capacity separatory funnel was charged 593 grams of hydrogenation reactor effluent from Example I. A solution of 36.4 grams HCl in 1.5 liters of water was added and the paraffin solution extracted and the layers separated. The paraffin layer after drying weighed 383.5 grams and contained 0.5 gram of amines. The aqueous-amine salt solution was extracted twice with 1100 ml. portions of pentane. To the aqueous-amine salt solution was added a 20% aqueous sodium hydroxide solution until a pH of 10 was obtained whereupon the bottom water layer was separated. Water and carry-along pentane were removed from the amines at 14–20 torr. and at a temperature ranging from 25–50° C. yielding 128.9 grams of amines.

The amines are distilled through a six-inch column at 14 torr at a temperature of from 208 to 287.6° F., and 115.9 grams of 99+ percent purity primary amine product was obtained.

EXAMPLE IV

Into a four-liter capacity separatory funnel was charged 500 grams of the hydrogenation reactor effluent from Example I, 150 cc. of 5 M $H_2SO_4$ added and the layers separated. The paraffin layer, after drying over calcium sulfate weighed 323 grams and did not contain any detectable amines. The aqueous-amine salt solution was extracted twice with 350 ml. portions of pentane. Approximately three moles of concentrated ammonium hydroxide were added until the pH of the aqueous solution reached 10 and the aqueous layer separated. Water and carry-along pentane were removed from the amines at 14–20 torr and at a temperature ranging from 25–50° C. The yield of crude amines was 112.5 grams.

The amines are distilled through a 6 inch column at 14 torr and at a temperature of from 208–287.6° F., to obtain 101 grams of 99+ percent purity primary amine product.

EXAMPLE V

Into a four-liter capacity separatory funnel was charged 700 grams of hydrogenation reactor effluent from Example I. A solution of 151.2 grams of 86% $H_3PO_4$ in 186 cc. of water was added and the paraffin solution extracted. After separation and drying the paraffin layer weighed 497 grams and contained 1.0 gram of amine. The aqueous-amine salt solution was extracted twice with 350 ml. portions of pentane. To the aqueous-amine salt solution was added 3.51 moles of ammonia, one liter of water and the mixture heated to 50° C. to dissolve the ammonium phosphate salts. The mixture was cooled to room temperature and the bottom water layer separated.

Water and carry-along pentane was removed from the amines at 14–20 torr and at a temperature of from 25–50° C. yielding 156 grams of amines.

The amines are distilled at 14 torr and at a temperature ranging from 208–287.6° F. and 140 grams of 99+ percent purity primary amine product was obtained.

We claim:

1. A process for the separation and recovery of a secondary alkyl primary amine having from 10 to 25 carbon atoms from crude hydrogenated nitroparaffin compositions containing said amine and a $C_{10}$ to $C_{25}$ ketone, alcohol and paraffin hydrocarbon which comprises:
   (a) treating said crude composition with an inorganic acid and from about 0.15 to about 6 volumes of water for each volume of said crude composition at a temperature of from about 50° F. to about 250° F., thereby forming an aqueous and a hydrocarbon phase, said aqueous phase having a pH ranging from about 3.5 to about 7;
   (b) separating and washing said aqueous phase of (a) with a liquid hydrocarbon having from 4 to 8 carbon atoms and recovering said aqueous phase;
   (c) treating said aqueous phase of (b) with at least a stoichiometric amount of base; and
   (d) separating said secondary alkyl primary amine from said treated aqueous phase of (c).

2. A process according to claim 1 wherein said inorganic acid is hydrochloric acid.

3. A process according to claim 1 wherein said inorganic acid is sulfuric acid.

4. A process according to claim 1 wherein said inorganic acid is phosphoric acid.

5. A process according to claim 1 wherein said inorganic acid is nitric acid.

6. A process according to claim 1 wherein said crude composition in (a) is treated with from 1 to 1.6 moles of said acid per mole of said amine.

7. A process according to claim 1 wherein said water to crude volume ratio in (a) is from 0.20–3 to 1.

8. A process according to claim 1 wherein said liquid hydrocarbon is pentane.

9. A process according to claim 1 wherein separation step (b) is carried out at a temperature between 50° F. and 250° F.

10. A process according to claim 1 wherein from one to three moles of said base are added in (c) per mole of said acid added in (a).

11. A process according to claim 1 wherein said base is sodium hydroxide.

12. A process according to claim 1 wherein said secondary alkyl primary amine separated in step (d) is a mixture of amines having from 10 to 14 carbon atoms.

References Cited

UNITED STATES PATENTS 3,366,686  1/1968  Rosenthal et al. _____ 260—583

CHARLES B. PARKER, Primary Examiner

R. L. RAYMOND, Assistant Examiner

U.S. Cl. X.R.

260—705